United States Patent [19]

Noda et al.

[11] Patent Number: 5,708,752
[45] Date of Patent: Jan. 13, 1998

[54] FLUORIDE OPTICAL FIBER FOR HIGH POWER LASER TRANSMISSION

[75] Inventors: Yukio Noda, Hatoyama-Machi; Yoshinori Mimura, Wako; Tetsuya Nakai; Toshio Tani, both of Tokyo-To, all of Japan

[73] Assignee: Kokusai Denshin Denwa Kabushiki Kaisha, Tokyo, Japan

[21] Appl. No.: 672,538

[22] Filed: Jun. 28, 1996

[30] Foreign Application Priority Data

Jul. 14, 1995 [JP] Japan .................. 7-200225
Jul. 14, 1995 [JP] Japan .................. 7-200226

[51] Int. Cl.[6] ............................................. G02B 6/00
[52] U.S. Cl. ........................... 385/141; 385/142; 385/144
[58] Field of Search .................. 65/388, 397; 385/141–145

[56] References Cited

U.S. PATENT DOCUMENTS

| | | | |
|---|---|---|---|
| H1259 | 12/1993 | Aggarwal et al. | 65/388 |
| 5,308,371 | 5/1994 | Kawamoto et al. | 65/388 |
| 5,334,232 | 8/1994 | France et al. | 65/388 |
| 5,401,289 | 3/1995 | France et al. | 65/388 |
| 5,560,759 | 10/1996 | Kortan et al. | 65/388 |

*Primary Examiner*—John Ngo
*Attorney, Agent, or Firm*—Emmanuel J. Lobato; Burns & Lobato, P.C.

[57] ABSTRACT

A high power laser transmitting fluoride glass fiber of an enhanced 2.94- µm laser damage threshold value is disclosed, in which either of the core with a high refractive index and the cladding with a low refractive index is formed of fluoride glass which contains fluorine (F) as a component but has it substituted with 0 to 4.1 mol % of bromine (Br), chlorine (Cl), or bromine and chlorine. The optical fiber of the present invention may have its core formed of fluoride glass and its cladding formed of fluorine-contained resin, and the core glass has a composition that 70 to 80% of fluorine (F) is substituted with 0 to 4.1 mol % of bromine (Br), or chlorine (Cl), or bromine and chlorine.

11 Claims, 5 Drawing Sheets

FLUORIDE OPTICAL FIBER FOR HIGH POWER LASER TRANSMISSION

BACKGROUND OF THE INVENTION

The present invention relates to a fluoride optical fiber which transmits infrared light and, more particularly, to a high power laser transmitting fluoride optical fiber for the transmission of high output laser light of ophthalmologic or dental laser medical care instruments or curers.

The present invention relates also to a fluoride optical fiber for transmitting therethrough infrared light and, more particularly, to a fluoride optical fiber with its cladding formed of fluorine-contained resin for use in a chemical sensing system or the like which employs a near infrared radiation.

There have been proposed fluoride optical fibers whose cores and claddings are formed of at least either one of $ZrF_4$ and $HfF_4$ and $BaF_2$, $LaF_3$, $AlF_3$ and NaF, respectively.

The conventional fluoride optical fiber have a wide transmission window of a 0.5 to 4 μm wavelength range, but they contain microcrystals, bubbles and like foreign substances as scatterers and hence they encounter a problem in the transmission of high power laser even in the above-mentioned wavelength range. For example, the fluoride optical fiber formed principally of $ZrF_4$ has the potential for use as an infrared glass optical fiber for the transmission of high output laser light of an ophthalmologic or dental laser medical care instruments or curers but it cannot be used as an optical fiber for laser medical curers because its laser damage threshold value is as low as approximately 136.4 mJ far short of 200 mJ necessary for dental treatment as referred to in Applied Optics, Vol. 31, No. 27 (1992), pp.5833-5837, for instance.

There has been also proposed a fluoride optical fiber having its core formed of at least either one of $ZrF_4$ and $HfF_4$, and $BaF_2$, $LaF_3$, $AlF_3$ and NaF and its cladding formed of fluorine resin.

The fluoride optical fiber having its cladding formed of fluorine-contained resin (hereinafter referred to as a fluorine-contained resin-clad fiber) is defective in that the transmission wavelength region is narrower than that of a fluoride optical fiber having its cladding formed of glass (hereinafter referred to as a glass-clad fiber). Since the transmission wavelength region covers the wavelength region used in chemical sensing, however, the fluorine-contained resin-clad fiber can be used in this field without difficulty. Further, this fiber is easy to manufacture and permits reduction of manufacturing costs, and hence is most suitable for use in a field such as a chemical sensing system involving the use of many fibers. Despite such merits, the conventional fluorine-contained resin-clad fiber poses a problem in its application to a chemical sensing system using long fibers, because the fiber produces an appreciably high minimum transmission loss of about 200 dB/km, for example, in a 20-m long system (the fiber length being 40 m back and forth) a loss of 8 dB (16% in terms of transmittance) and in a 50-m long system (fiber length being 100 m back and forth) a loss as high as 20 dB (1% in transmittance).

SUMMARY OF THE INVENTION

An object of the present invention is to provide high power laser transmitting fluoride glass having an improved laser damage threshold value of 2.94 μm.

Another object of the present invention is to provide a fluorine-contained resin-clad fluoride optical fiber of improved transmission loss characteristic.

To attain the above first object, the high power laser transmitting fluoride optical fiber according to the present invention has a structure which is characterized in that at least the core of the core and cladding is formed of fluoride glass with fluorine (F) substituted by 0 to 4.1 mol % of bromine (Br), chlorine (Cl), or bromine (Br) and chlorine (Cl).

The glass containing fluorine (F) can be made to contain 11 to 16 mol % of zirconium (Zr), hafnium (Hf), or zirconium (Zr) and hafnium (Hf), 3 to 11 mol % of barium (Ba), 0.5 to 2 mol % of lanthanum (La), 0.5 to 1.5 mol % of aluminum (Al), 1 to 6 mol % of sodium (Na) and 70 to 80 mol % of fluorine (F).

To attain the above second object, the fluorine-contained resin-clad fluoride optical fiber whose core is formed of glass containing fluorine (F) as a constituent, which is substituted with 0 to 4.1 mol % of bromine (Br), chlorine (Cl), or bromine and chlorine and whose cladding is formed of fluorine-contained resin.

The glass containing fluorine (F) can be composed of at least 11 to 16 mol % of zirconium (Zr), hafnium (Hf), or zirconium and hafnium, and 3 to 11 mol % of barium (Ba), 0.5 to 2 mol % of lanthanum (La), 0.5 to 1.5 mol % of aluminum (Al), 1 to 6 mol % of sodium (Na) and 70 to 80 mol % of fluorine (F).

BRIEF DESCRIPTION OF THE DRAWING

The present invention will be described in detail below with reference to the accompanying drawings, in which.

DETAILED DESCRIPTION

Figure 1:
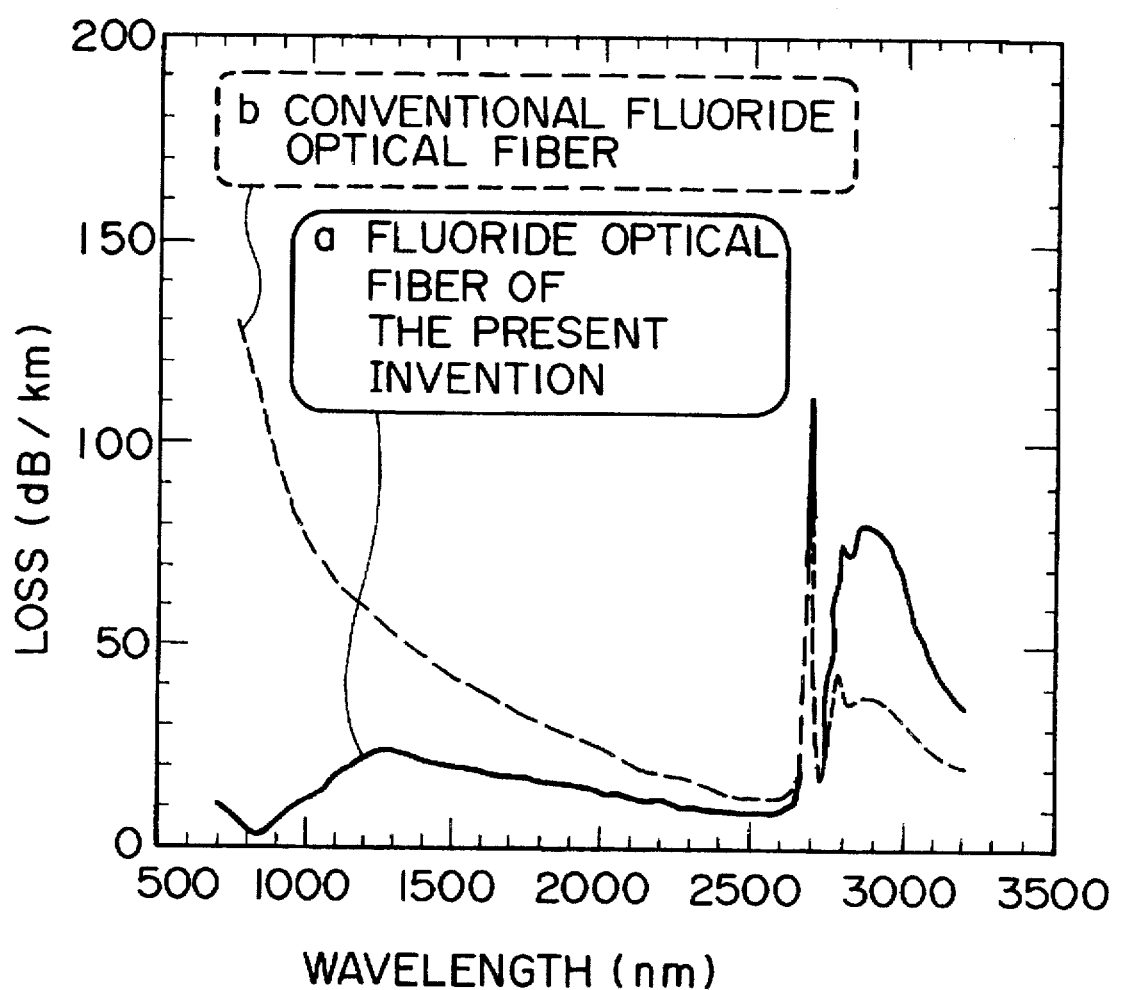
FIG. 1 is a graph showing the loss characteristic of the fluoride glass fiber according to the present invention.

To clarify a first mode for carrying out the present invention, a description will be given first of the inventor's studies and experiments conducted until he succeeded in realizing the optical fiber of the present invention.

The inventors of this application gave careful consideration to damage of the fluoride optical fiber by 2.94- μm laser light as described below. He considered that the laser damage is a phenomenon that a photoelectric field concentrates on crystal, bubbles and other foreign objects in the fiber and, upon reaching a breakdown electric field value, produces an electrical breakdown, melting glass surrounding the foreign objects by heat generation resulting from the breakdown. Accordingly, it was expected that the laser damage threshold value could be improved by thorough removal of foreign substances from the fiber glass. In terms of fiber characteristics, it was concluded that the above-mentioned phenomenon would never occur in a fiber having a theoretical value of Rayleigh scattering by thoroughly suppressing the scattering of light in glass. However, light scattering values of fluoride optical fibers reported so far were all several times larger than the theoretical value; this was considered the probable cause of the low laser damage threshold value.

From this standpoint, the inventor gave the glass manufacturing process a thorough cleaning to exclude the possibility of foreign substances getting mixed into glass during manufacturing. As the result of this, they succeeded in the production of a low scattering fluoride glass fiber consisting principally of at least one of $ZrF_4$ and $HfF_4$, and $BaF_2$, $LaF_3$, $AlF_3$ and NaF and having a light scattering value reduced down to three times the theoretical value (0.06 dB/km at a 1.6- μm wavelength). The fiber thus obtained was tested at the transmission of laser light of a 2.94- μm wavelength and the laser damage threshold value was calculated. The laser damage threshold value was in the range of between 200 and 250 mJ. This figure was higher than that referred to in the afore-mentioned literature, and hence the quality of fiber was improved as compared with conventional fluoride optical fiber. This indicated that the cleaning of the manufacturing process produced the effect as expected and that the above-mentioned consideration was correct. However, this laser damage threshold value was merely close to the value 200 mJ required of a dental laser care instrument and hence was unsatisfactory.

Based on the above-mentioned experimental results, the inventors of this application took such a view as described below. Since it was concluded from the experimental results that the presence of foreign objects in the fiber had decreased the laser damage threshold value, it was clear that the threshold value could be kept high by taking steps of more thoroughly removing the foreign substances from the fiber. The inventors closely examined the cause of scattering still present even in the afore-mentioned low scattering optical fiber and, as a result, they determined that the scattering of light was attributable to microcrystals of a sub- μm size which could not be specified under a microscope. And they considered that since microcrystals would precipitate in the fiber during manufacturing and the cause of precipitation might correlate with the stability of glass, that is, the microcrystals would be formed during manufacturing due to insufficient stability of glass. Then the inventors of this application considered that sufficiently enhanced stability of glass would suppress the formation of microcrystals in the fiber and hence could improve the laser damage threshold value.

Based on his studies mentioned above, the inventors of this application made efforts to improve the stability of fluoride glass through control of its composition. The inventors made a thermal analysis of every glass containing components having the potential for contributing to the glass stability and calculated the Hrub's glass stability index indicating the glass stability described in Material Science Forum, Vol. 67 & 68 (1991), pp. 225–232. As the result of this, it was found that the stability drastically improved with fluoride glass wherein fluorine (F) was substituted with 0 to 4.1% of bromine (Br) and chlorine (Cl) as described below. Table 1 shows part of the results of experiments conducted by the inventors.

TABLE 1

| Glass No. | Zr (%) | Ba (%) | La (%) | Al (%) | Na (%) | F (%) | Br (%) | Cl (%) | Total (%) | Stability index | Visual evaluation of scattered light intensity |
|---|---|---|---|---|---|---|---|---|---|---|---|
| 1 | 13.3 | 6.3 | 1.0 | 0.8 | 3.8 | 74.8 | | | 100.0 | 1.3. | ○ |
| 2 | 13.3 | 6.3 | 1.0 | 0.8 | 3.8 | 73.5 | | 1.3 | 100.0 | 2 | ⊙ |
| 3 | 13.3 | 6.4 | 1.0 | 0.8 | 2.5 | 74.5 | 1.3 | | 100.0 | 2 | ⊙ |
| 4 | 13.3 | 5.2 | 1.0 | 0.8 | 2.6 | 74.0 | 2.6 | | 100.0 | 2.3 | ⊙ |

Visual evaluation of scattered light intensity:
⊙ very low
○ low

As will be appreciated from the above, the glass stability index improved about 50% higher than that of conventional glass by substituting fluorine (F) with 1.3% of bromine (Br) and chlorine (Cl), and as high as more than twice in 2.6% substituted glass.

Further, He—Ne laser light was transmitted through the glass and a visual check is made of the intensity of light scattered from the glass under a non-fluorescent lamp. In the above, the visual evaluation (low) represents that the optical path by the He—Ne laser beam in the glass is not clear but can be visually identified and that the intensity of light scattered from the glass is low. On the other hand, the visual evaluation (very low) represents that the optical path by the laser beam is hard to identify as compared with the above and that the intensity of light scattered from the glass is very low. Thus, in embodiments of the present invention marked with glass Nos. 2, 3 and 4, the intensity of scattered light is far lower than in the case of conventional glass marked No. 1.

Table 2 shows some of the results of other experiments conducted by the inventor. It was found that the glass fibers in the table (except glass No. 9) exhibit a very weak scattering characteristic similar to that of the glass fibers Nos. 2–4 in Table 1 and achieve high glass stability.

TABLE 2

| Glass No. | Zr (%) | Ba (%) | La (%) | Al (%) | Na (%) | K (%) | F (%) | Br (%) | Cl (%) | Total (%) | Visual evaluation of scattered light intensity |
|---|---|---|---|---|---|---|---|---|---|---|---|
| 5 | 13.2 | 7.2 | 1.0 | 0.7 | 2.0 | | 74.9 | | 0.2 | 100.0 | ⊙ |
| 6 | 13.2 | 7.2 | 1.0 | 0.7 | 2.8 | | 74.1 | | 1.0 | 100.0 | ⊙ |
| 7 | 13.3 | 6.5 | 1.0 | 0.8 | 3.5 | | 71.4 | | 3.5 | 100.0 | ⊙ |

TABLE 2-continued

| Glass No. | Zr (%) | Ba (%) | La (%) | Al (%) | Na (%) | K (%) | F (%) | Br (%) | Cl (%) | Total (%) | Visual evaluation of scattered light intensity |
|---|---|---|---|---|---|---|---|---|---|---|---|
| 8 | 13.5 | 5.1 | 1.0 | 0.8 | 5.1 | | 70.4 | | 4.1 | 100.0 | ⊙ |
| 9 | 13.5 | 5.1 | 1.0 | 0.8 | 5.1 | | 69.4 | | 5.1 | 100.0 | o |
| 10 | 13.4 | 6.2 | 1.0 | 0.8 | 3.7 | | 74.8 | 0.1 | | 100.0 | ⊙ |
| 11 | 13.4 | 6.1 | 1.0 | 0.8 | 3.7 | | 74.7 | 0.3 | | 100.0 | ⊙ |
| 12 | 13.8 | 6.5 | 1.0 | 0.8 | 2.8 | | 74.0 | 2.3 | | 100.0 | ⊙ |
| 13 | 13.3 | 6.3 | 1.0 | 0.8 | 2.8 | 0.8 | 74.1 | 0.8 | | 100.0 | ⊙ |
| 14 | 13.3 | 6.5 | 1.0 | 0.8 | 2.5 | 1.0 | 73.9 | 1.0 | | 100.0 | ⊙ |
| 15 | 13.5 | 5.1 | 1.0 | 0.8 | 3.7 | 1.3 | 73.3 | 1.3 | | 100.0 | ⊙ |
| 16 | 13.5 | 5.1 | 1.0 | 0.8 | 2.8 | 2.5 | 72.0 | 2.5 | | 100.0 | ⊙ |

Visual evaluation of scattered light intensity:
⊙ very low
o low

Table 3 shows some examples of fibers whose cores and claddings were formed using the glass according to the present invention. Then, He—Ne laser light was transmitted through the fibers and the scattered light intensity was evaluated for each fiber. As compared with a fiber using conventional glass for its core, the scattered light intensity was dramatically reduced down to the level of the theoretical value. From this, it could be understood that the enhanced glass stability by the substitution of fluorine (F) with bromine (Br) and chlorine (Cl) effectively suppressed the formation of microcrystals during the manufacture of glass. Incidentally, the suppression of the scattered light intensity in fibers calls for the use of the Br- and Cl-substituted glass for both of the core and cladding; no substantial reduction was observed in the scattered light intensity when only the core was formed of the substituted glass.

traditional composition because of its inadequate glass stability. This defect of the conventional glass lacking an adequate glass stability gives rise to a serious problem in the heating step of the fiber manufacturing process as described below. That is, the afore-mentioned surface defects in the core glass triggers a phenomenon of precipitating microcrystals in the core glass surface in quantities due to the defect of the conventional glass lacking adequate glass stability. The inventors considered that precipitated microcrystals would function as the surface discontinuity and exert a strong mode translating action on guided light confined within the core in the core glass surface, resulting in losses.

The above has described the problem of the conventional fluorine-contained resin-clad fluoride optical fiber that the surface discontinuity causes an increase in transmission loss; next, a description will be given of how the problem is

TABLE 3

| Fiber No. | Core glass | | | | | | | | | Cladding glass | | | | | | | |
|---|---|---|---|---|---|---|---|---|---|---|---|---|---|---|---|---|---|
| | Zr | Ba | La | Al | Na | F | Br | Cl | Total | Hf | Ba | La | Al | Na | F | Br | Cl | Total |
| 1 | 13.5% | 6.1% | 1.0% | 0.8% | 3.1% | 74.5% | 1.0% | | 100.0% | 13.0% | 4.9% | 1.3% | 1.0% | 5.4% | 74.1% | 0.3% | | 100.0% |
| 2 | 13.5% | 6.4% | 1.0% | 0.8% | 2.6% | 74.4% | 1.0% | | 100.0% | 13.0% | 4.7% | 1.3% | 1.0% | 5.5% | 74.0% | 0.3% | | 100.0% |
| 3 | 13.2% | 7.2% | 1.0% | 0.8% | 2.7% | 74.1% | | 1.0% | 100.0% | 13.5% | 5.2% | 1.0% | 0.8% | 5.0% | 74.5% | | 0.1% | 100.0% |
| 4 | 13.2% | 7.2% | 1.0% | 0.8% | 2.7% | 74.1% | | 1.0% | 100.0% | 12.9% | 4.9% | 1.3% | 1.0% | 5.7% | 73.9% | | 0.3% | 100.0% |

To clarify a second mode for carrying out the present invention, a description will be given first of the inventor's studies and experiments conducted until they succeeded in realizing the optical fiber of the present invention.

The inventors of this application gave careful consideration to the cause of high transmission losses by the conventional fluorine-contained resin-clad fluoride optical fiber as described below. They considered that high losses would be caused for the reason that light confined within the core is mode-translated by a surface discontinuity in the core surface and leaks from the core. Next, a mechanism that yields the surface discontinuity will be described. In the surface of core glass there naturally exist a number of microscopic surface defects. The presence of the surface defects is not a phenomenon characteristic of the fluoride glass but a phenomenon common to ordinary glass materials, and the surface defects dominate the fiber strength or in a heating step of the fiber manufacturing process they function as growth nuclei and induce the precipitation of crystals. Incidentally, he considered that microcrystals as scatterers are readily formed in the fluoride glass of the solved. The key to solving the problem is in the above consideration. That is, since the direct cause of increased loss is the microcrystals in the core glass surface, it is apparent that the problem could be settled by taking steps for suppressing the formation of the microcrystals. Then, what means should be taken to suppress the formation of microcrystals? A solution to this problem can also be found in the consideration described above. As referred to previously herein, a primary cause of the formation of microcrystals is surface defects present in the fiber and it is difficult to avoid this. A secondary cause of the formation of microcrystals is inadequate glass stability of the core. Hence, it can be said that the enhancement of the glass stability is the key to the fabrication of a low-loss fluorine-contained resin-clad fiber which is the object of the present invention. With increased stability of the core glass, even if surface defects are present in the core glass surface, the precipitation of microcrystals could sufficiently be suppressed by the effect of substantially improved glass stability and light confined within the core would be guided without mode translation, solving the high-loss problem of the conventional fiber.

Based on his studies mentioned above, the inventor of the present invention made efforts to improve the glass stability of the fluoride glass through control its composition with a view to enhancing the loss characteristic of the fiber. The inventor made a thermal analysis of every glass containing components having the potential for contributing to the glass stability and calculated the Hrub's glass stability index indicating the glass stability described in Material Science Forum, Vol. 67 & 68 (1991), pp. 225–232. As the result of this, it was found that the glass stability drastically improved with fluoride glass wherein fluorine (F) was substituted with 0 to 4.1% of bromine (Br) and chlorine (Cl). Table 1 shows part of the results of experiments conducted by the inventors. As will be seen from the table, the glass stability index improved about 50% higher than that of the conventional glass by the substitution of fluorine (F) with 1.3% of bromine (Br) and chlorine (Cl), and as high as more than twice in 2.6% substituted glass.

Further, He—Ne laser light was transmitted through the glass and a visual check is made of the intensity of light scattered from the glass under a non-fluorescent lamp. In the above, the visual evaluation (low) represents that the optical path by the He—Ne laser beam in the glass is not clear but can be visually identified and that the intensity of light scattered from the glass is low. On the other hand, the visual evaluation (very low) represents that the optical path by the laser beam is hard to identify as compared with the above and that the intensity of light scattered from the glass is very low. Thus, in embodiments of the present invention marked with glass Nos. 2, 3 and 4, the intensity of scattered light is far lower than in the case of conventional glass marked with No. 1. Table 2 shows some of the results of other experiments conducted by the inventor. It was found that the glass fibers in the table (except glass No. 9) exhibit a very weak scattering characteristic similar to that of the glass fibers Nos. 4–2 in Table 1 and achieve high glass stability.

A fluorine-contained resin-clad fiber was fabricated using the glass of the present invention for the core. As the result of evaluating the loss characteristic of this fiber, it was found that the minimum loss in the vicinity of 2.2 μm could be substantially reduced from 150 dB/km down to 4 dB/km-this compares favorably with the loss characteristic of the glass clad fiber.

PREFERRED EMBODIMENTS

[Embodiment 1]

Next, a description will be given of an embodiment of the present invention wherein the core was formed of a material composed of 13.2 mol % of zirconium (Zr), 7.2 mol % of barium (Ba), 1.0 mol % of lanthanum (La), 0.7 mol % of aluminum (Al), 2.7 mol % of sodium (Na), 74.1 mol % of fluorine (F) and 1.0 mol % of chlorine (Cl) and the cladding a material composed of 12.9 mol % of hafnium, 4.9 mol % of barium (Ba), 1.3 mol % of lanthanum (La), 1.0 mol % of aluminum (Al), 5.7 mol % of sodium, 73.9 mol % of fluorine and 0.3 mol % of chlorine (Cl).

This fiber was produced using what is called a rotational casting process heretofore employed for the manufacture of fluoride fibers. That is, glass melt for the cladding and glass melt for the core were sequentially poured into a brass mold preheated to 250° C. and driven at 3000 rpm and cooled to obtain a glass preform. Then the glass preform was spun into a fiber having a core diameter of 320 μm, a cladding diameter of 450 μm and a numerical aperture 0.27. He—Ne laser light was launched into the fiber for the evaluation of the intensity of scattered light therefrom. As compared with a conventional fiber containing only fluorine (F) as a negative ion, the scattered light intensity drastically decreased down to substantially the theoretical value. From this, it could be understood that the enhanced glass stability by the substitution of fluorine (F) with chlorine (Cl) suppressed the formation of microcrystals in the fiber manufacturing process, decreasing the scattered light intensity. As shown in FIG. 1, the transmission loss of this fiber was below 100 dB/km at wavelengths from 0.7 to 3.2 μm, a minimum of 10 dB/km at 2.5 μm and 60 dB/km at 2.94 μm. As compared with the conventional fluoride optical fiber indicated by (b), there is no degradation of the characteristic of this fiber due to the partial substitution of fluorine (F) with chlorine (Cl) and the effect of the substitution with chlorine (Cl) is clearly demonstrated as a decrease in the loss by the suppression of scattering of light in the short wavelength region.

Figure 2:
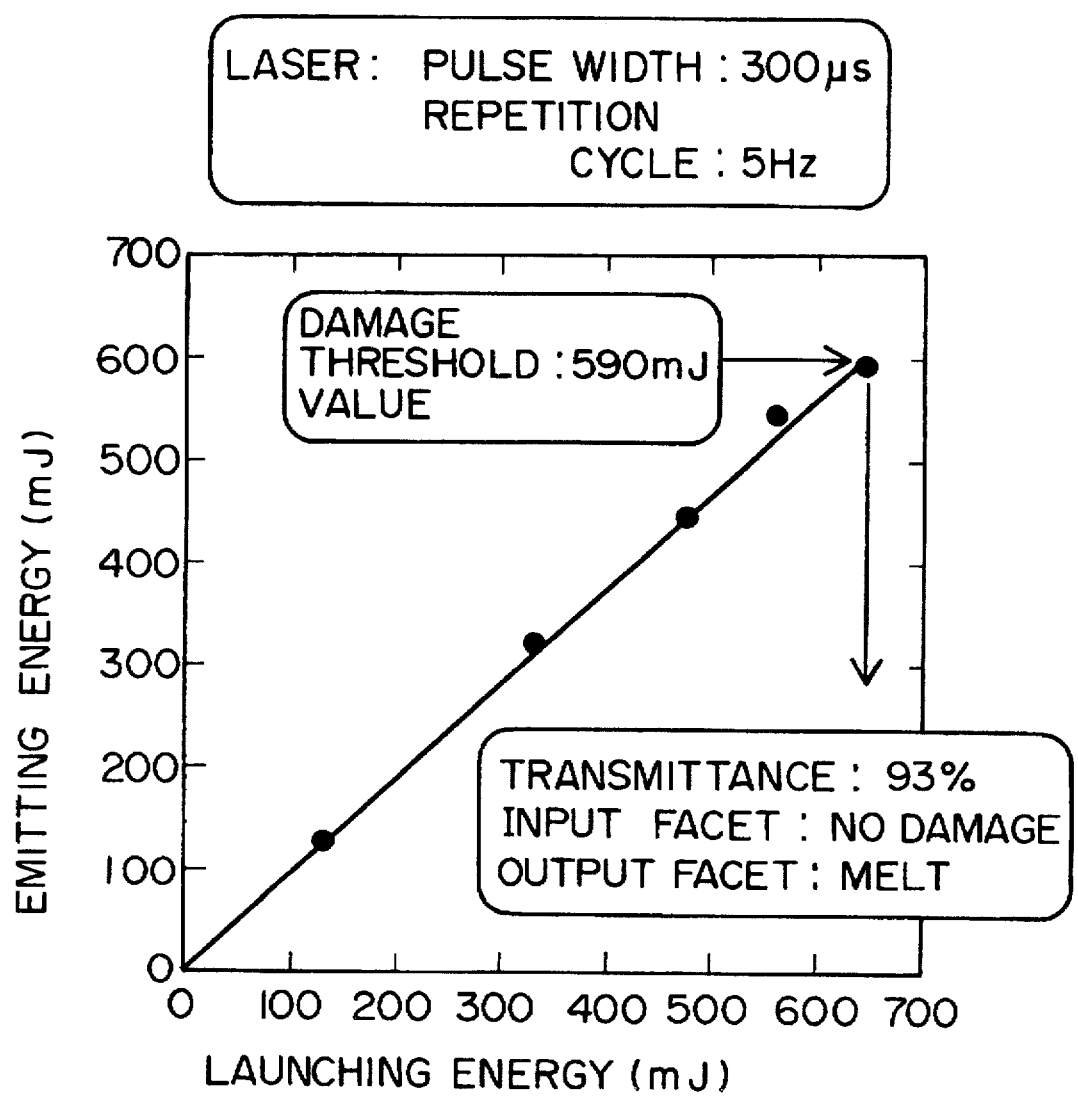
FIG. 2 is a graph showing the high power laser transmission characteristic of the fluoride glass fiber according to the present invention.

In FIG. 2 there are shown the results obtained when Er—YAG laser light of a 2.94- μm wavelength (5 Hz and 300- μm pulse width) was launched via a focusing lens into the long fluoride glass fiber 2 m in length. The fiber could transmit the laser light of an emitting energy up to 530 mJ with no output loss and the transmittance reached 93%; taking into account a Fresnel reflection of about 8% at both incident and emitting facets of the fiber, the transmittance was close to approximately 100%. Further, when the laser power was increased, the output from the fiber dropped after 1000 shots when the emitting energy was 590 mJ. The laser damage threshold value was 590 mJ, significantly higher than in the case of the conventional fiber containing only fluorine (F) as a negative ion. At this time, damage occurred in the emitting facet of the fiber, that is, the facet was molten. In an evaluation test of this fiber for transmission with a fixed output at 400 mJ (average output of 2 W, 5 Hz) per shot, a fixed output was provided until 9000 shots, that is, the laser output did not decrease.

[Embodiment 2]

A description will be given of another embodiment of the present invention in which the core was formed of a material composed of 13.3 mol % of zirconium (Zr), 6.5 mol % of barium (Ba), 1.0 mol % of lanthanum (La), 0.8 mol % of aluminum (Al), 2.5 mol % of sodium (Na), 1.0 mol % of potassium (K), 73.9 mol % of fluorine (F) and 1.0 mol % of bromine (Br) and the cladding a material composed of 12.9 mol % of hafnium (Hf), 4.9 mol % of barium (Ba), 1.3 mol % of lanthanum (La), 1.0 mol % of aluminum (Al), 5.4 mol % of sodium (Na), 0.3 mol % of potassium, 73.9 mol % of fluorine (F) and 0.3 mol % of bromine (Br).

In this embodiment, a glass preform was obtained by an ordinary method and was spun into a fiber having a core diameter of 350 μm, a cladding diameter of 440 μm and a numerical aperture 0.27. He—Ne laser light was launched into this fiber and the intensity of light scattered from the fiber was evaluated. As is the case with Embodiment 1, the scattered intensity light is sharply reduced down to substantially the theoretical value as compared with the conventional fiber containing only fluorine (F) as a negative ion. From this, it could be understood that the enhanced glass stability by partial substitution of fluorine (F) with chlorine (Cl) and bromine (Br) suppressed the formation of microcrystals in the fiber manufacturing process, lowering the scattered light intensity.

Figure 3:
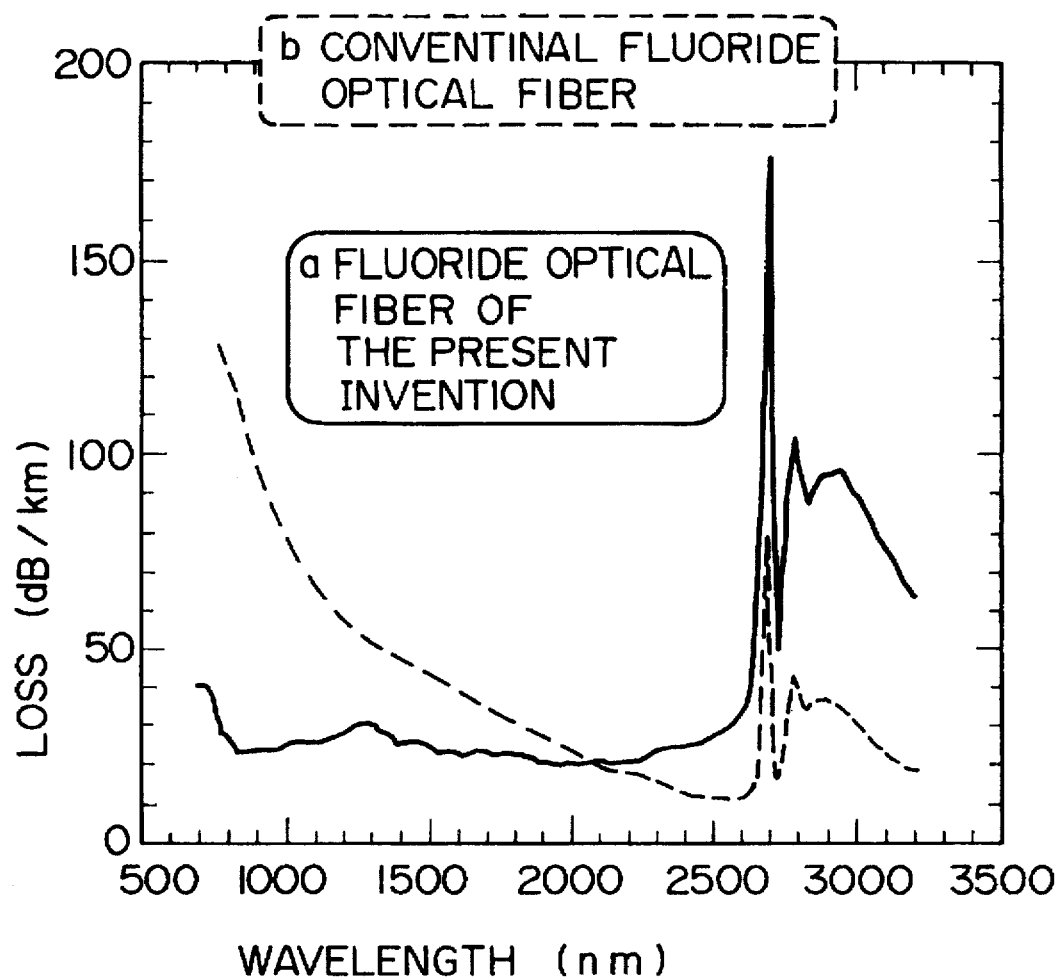
FIG. 3 is a graph showing the loss characteristic of the fluoride glass fiber according to the present invention.

As shown in FIG. 3, the transmission loss of this fiber was below 200 dB/km at a wavelength of 0.7 to 3.2 μm, a minimum of 20 dB/km at about 2.3 μm and 90 dB/km at 2.94 μm. As compared with the conventional fluoride optical fiber indicated by (b), there is no degradation of the characteristic of this fiber due to the partial substitution of fluorine (F) with chlorine (Cl) and the effect of the substitution with chlorine (Cl) is clearly demonstrated as a decrease in the loss by the suppression of scattering of light in the short wavelength region.

Figure 4:
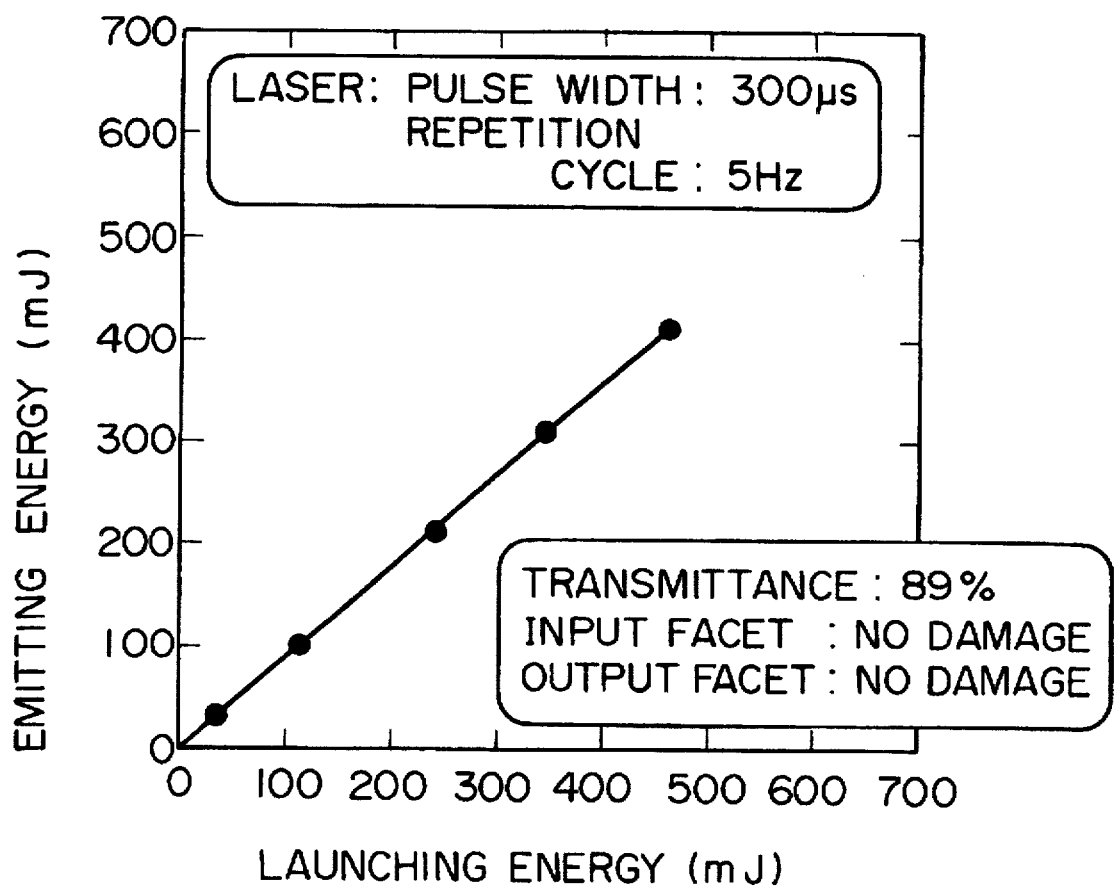
FIG. 4 is a graph showing the high power laser transmission characteristic of the fluoride glass fiber according to the present invention.

In FIG. 4 there are shown the results obtained when Er—YAG laser light of a 2.94- μm wavelength (5 Hz and 300- μm pulse width) was launched via a focusing lens into the long fluoride glass fiber 2 m in length. The fiber could transmit the laser light of an emitting energy of up to 410 mJ with no output loss and the transmittance reached 90%; taking into account a Fresnel reflection of about 8% at both incident and emitting facets of the fiber, the transmittance was close to approximately 100%.

Incidentally, it is considered that preferable ranges of the fluoride glass composition of the Zr—Hf—Ba—La—Al—Na—F series are 11 to 16 mol % of zirconium (Zr) or hafnium (Hf), or zirconium (Zr) and hafnium (Hf), 3 to 11 mol % of barium (Ba), 0.5 to 2 mol % of lanthanum (La), 0.5 to 1.5 mol % of aluminum (Al), 1 to 6 mol % of sodium (Na) and 70 to 80 mol % of fluorine (F).

[Embodiment 3]

A description will be given of a third embodiment in which the core is formed of a material containing 13.2 mol % of zirconium (Zr), 7.2 mol % of barium (Ba), 1.0 mol % of lanthanum (La), 0.8 mol % of aluminum (Al), 2.5 mol % of sodium (Na), 75.1 mol % of fluorine (F) and 0.3 mol % of chlorine (Cl) and the cladding is formed of tetrafluoroethylene-propylene fluoride copolymer resin (FEP) of thermal shrinkability.

Figure 5:
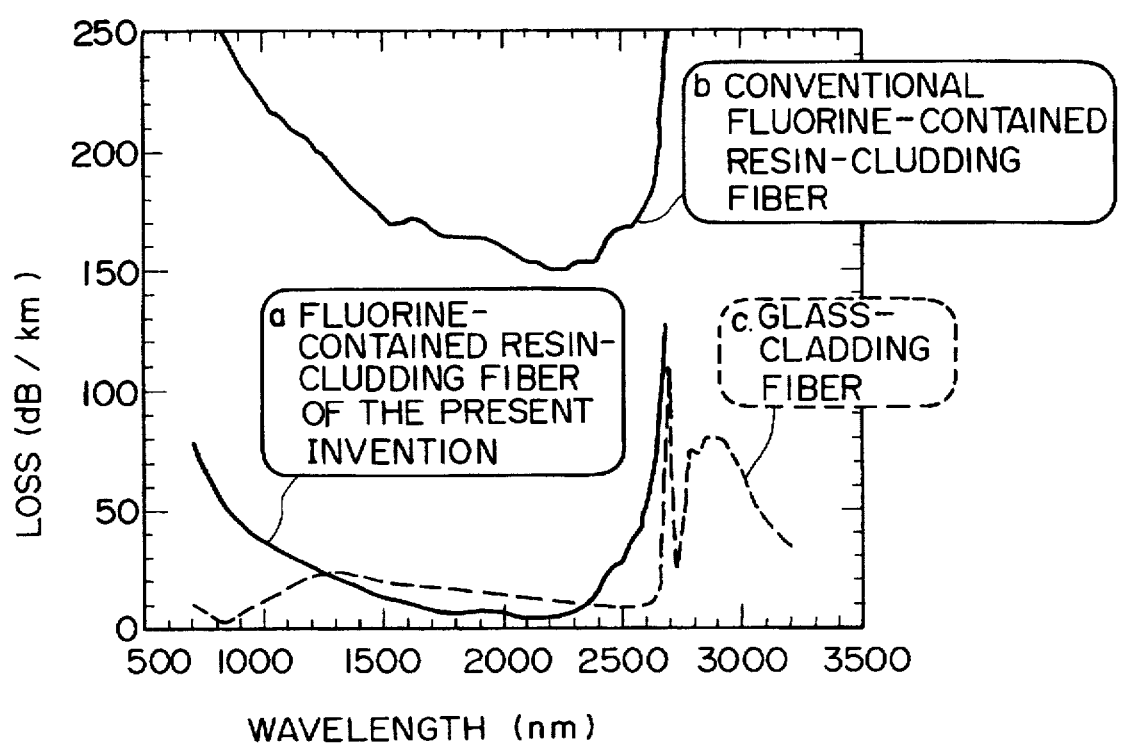
FIG. 5 is a graph showing the loss characteristic of the fluorine-contained resin-clad fluoride optical fiber according to the present invention.

In the fabrication of this fiber, a rod-shaped core glass was inserted into a pipe-shaped FEP, which was then shrunk by heating into close contact with the core glass rod to obtain a preform. Next, the preform was spun into a fiber having a core diameter of 400 μm, a cladding diameter of 430 μm and a numerical aperture 0.65. In FIG. 5 there are shown the results of evaluation of the loss characteristic of this fiber. In FIG. 1 there is also shown the loss characteristic of the conventional fluorine-contained resin-clad fiber; according to the present invention, the minimum loss in the vicinity of 2.2 μm could be drastically reduced down to 4 dB/km from 150 dB/km experienced in the past. Further, FIG. 5 shows also the loss characteristic of the glass-clad fiber; the fiber according to the present invention achieved lower losses than the glass-clad fiber in the wavelength region from 1200 to 2300 nm.

The fluorine-contained resin is not limited specifically to the tetrafluoroethylene-propylene fluoride (FEP) mentioned in the above embodiment but it is also possible to use such fluorine-contained resins as polytetrafluoroethylene resin (PTFE), tetrafluoroethylene-p-fluorovinyl ether copolymer resin (PFA), tetrafluoroethylene-ethylene copolymer (ETFE), polyvinylidene fluoride and trifluoromonochloroethylene.

Incidentally, it is considered that preferable ranges of the fluoride glass composition of the Zr—Hf—Ba—La—Al—Na—F series are 11 to 16 mol % of zirconium (Zr) or hafnium (Hf), or zirconium and hafnium, 3 to 11 mol % of barium (Ba), 0.5 to 2 mol % of lanthanum (La), 0.5 to 1.5 mol % of aluminum (Al), 1 to 6 mol % of sodium (Na) and 70 to 80 mol % of fluorine (F).

With the fluoride optical fiber according to the present invention, the substitution of fluorine (F), which is a component of glass, with 0 to 4.1% of bromine (Br) and chlorine (Cl) makes the glass stability higher than in the conventional fluoride glass and suppresses the formation of microcrystals during manufacturing. This produces a unique effect of increasing the power of laser from 200 mJ or so to 590 and 410 mJ without damage as mentioned above in respect of the embodiments.

The fluoride optical fiber according to the present invention is highly expected to be used as an infrared glass optical fiber for the transmission of high output laser light of ophthalmologic and dental laser medical care instruments employing 2.94 μm laser light and it has the potential for making great contributions to various industrial fields.

With the fluorine-contained resin-clad fluoride optical fiber according to the present invention, the substitution of fluorine (F), which is a component of the fluoride glass for the core, with 0 to 4.1% of bromine (Br) and chlorine (Cl) makes the glass stability higher than in the conventional fluorine-contained resin-clad fluoride optical fiber and suppresses the formation of microcrystals in the heating step of the fiber manufacturing process. This produces a unique effect that light confined within the core is guided without mode translation, hence permitting substantial reduction of the fiber transmission loss from 150 dB/km down to 4 dB/km. The fluoride optical fiber according to the present invention is highly expected to be used as a chemical sensing optical fiber employing near infrared radiation or the like and it has the potential for making great contributions to various industrial fields.

What we claim is:

1. A fluoride optical fiber for high power laser transmission, in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine.

2. A fluoride optical fiber for high power laser transmission, in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine.

3. A fluoride optical fiber for high power laser transmission in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine, and in which said fluoride glass contains, as constituents, barium (Ba), lanthanum (La), aluminum (Al), sodium (Na) and fluorine (F) in addition to zirconium (Zr), hafnium (Hf), or zirconium and hafnium.

4. A fluoride optical fiber for high power laser transmission in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine, and in which said fluoride glass contains, as constituents, 11 to 16 mole % of barium (Ba), 0.5 to 2 mole % of lanthanum (La), 0.5 to 1.5 mole % of aluminum (Al), 1 to 6 mole % of sodium (Na) and 70 to 80 mole % of fluorine (F).

5. A fluoride optical fiber with a cladding of fluorine resin, in which a core of said fluoride optical fiber is formed of fluoride glass containing fluorine (F) as a constituent, said fluoride glass being substituted with an additive less than 4.1 mole % of bromine (Br), chlorine (Cl), or bromine and chlorine and, in which said cladding is formed of said fluorine-contained resin.

6. A fluoride optical fiber with a cladding of fluorine resin according to claim 5, in which said fluoride glass contains as constituents barium (Ba), lanthanum (La), aluminum (Al), sodium (Na) and fluorine (F) in addition to zirconium (Zr), hafnium (Hf), or zirconium and hafnium.

7. A fluoride optical fiber with a cladding of fluorine resin according to claim 5, in which said fluoride glass contains 11 to 16 mole % of zirconium (Zr), hafnium (Hf), or zirconium and hafnium, 3–11 mole % of barium (Ba), 0.5 to 2 mole % of lanthanum (La), 0.5 to 1.5 mole % of aluminum (Al), 1 to 6 mole % of sodium (Na) and 70 to 80 mole % of fluorine.

8. A fluoride optical fiber with a cladding of fluorine resin according to claim 5, in which said fluoride glass contains as constituents barium (Ba), lanthanum (La), aluminum (Al), sodium (Na), fluorine (F) and potassium (K) in addition to zirconium (Zr), hafnium (Hf), or zinconium and hafnium.

9. A fluoride optical fiber with a cladding of fluorine resin according to claim 5, in which said fluoride glass contains 11–16 mole % of zirconium (Zr), hafnium (Hf), or zirconium and hafnium, 3 to 11 mole % of barium (Ba), 0.5 to 2 mole % of lanthanum (La), 0.5 to 1.5 mole % of aluminum (Al), 1 to 6 mole % of sodium (Na), 0.8 to 2.5 mole % of potassium (K) and 70 to 80 mole % of fluorine (F).

10. A fluoride optical fiber for high power laser transmission in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine, and in which said fluoride glass contains, as constituents, barium (Ba), lanthanum (La), aluminum (Al), sodium (Na), fluorine (F) and potassium (K) in addition to zirconium (Zr), hafnium (Hf), or zirconium and hafnium.

11. A fluoride optical fiber for high power laser transmission in which a core and a cladding of said fluoride optical fiber are formed of fluoride glass containing fluorine as a constituent, said fluoride glass being partially substituted with an additive less than 4.1 mole % of bromine (Br), chlorine (Cl), or bromine and chlorine, and in which said fluoride glass contains, as constituents, 11 to 16 mole % of zirconium (Zr), hafnium (Hf), or zirconium and hafnium, and 3 to 11 mole % of barium (Ba), 0.5 to 2 mole % of lanthanum (La), 0.5 to 1.5 mole % of aluminum (Al), 1 to 6 mole % of sodium (Na), 0.8 to 2.5 mole % of potassium (K) and 70 to 80 mole % of fluorine (F).

* * * * *